(12) United States Patent
Hill et al.

(10) Patent No.: US 8,738,533 B2
(45) Date of Patent: May 27, 2014

(54) REAL-WORLD ITEMS UNLOCKING VIRTUAL ITEMS ONLINE AND IN VIDEO GAMES

(75) Inventors: Greg Hill, Saugus, CA (US); Stephanie Meyer, Monrovia, CA (US); Mark Harwood, Van Nuys, CA (US)

(73) Assignee: Disney Enterprises, Inc., Burbank, CA (US)

( * ) Notice: Subject to any disclaimer, the term of this patent is extended or adjusted under 35 U.S.C. 154(b) by 529 days.

(21) Appl. No.: 12/592,256

(22) Filed: Nov. 19, 2009

(65) Prior Publication Data

US 2011/0105220 A1 May 5, 2011

Related U.S. Application Data

(60) Provisional application No. 61/280,178, filed on Oct. 29, 2009.

(51) Int. Cl.
*G06F 21/00* (2013.01)
*G06Q 20/12* (2012.01)

(52) U.S. Cl.
CPC .................................. *G06Q 20/1235* (2013.01)
USPC ........................................................ 705/51

(58) Field of Classification Search
USPC .................................................... 705/50–79
See application file for complete search history.

(56) References Cited

U.S. PATENT DOCUMENTS

| | | | |
|---|---|---|---|
| 2002/0026478 A1* | 2/2002 | Rodgers et al. | 709/205 |
| 2002/0052229 A1* | 5/2002 | Halliburton et al. | 463/9 |
| 2005/0059483 A1 | 3/2005 | Borge | |
| 2006/0003826 A1* | 1/2006 | Walker et al. | 463/9 |
| 2008/0163055 A1* | 7/2008 | Ganz et al. | 715/706 |
| 2008/0265509 A1* | 10/2008 | Gatzios | 273/296 |

FOREIGN PATENT DOCUMENTS

| | | |
|---|---|---|
| EP | 1 933 269 | 6/2008 |
| JP | 2008-114084 | 5/2008 |
| WO | WO 02/20111 | 3/2002 |
| WO | WO 2007/101785 | 9/2007 |

OTHER PUBLICATIONS

Kris Pigna: "Disney Launches Dgamer Online Service for DS", 1up, May 15, 2008, XP055069819, Retrieved from the Internet: URL: http://www.1up.com/news/disney-launches-dgamer-online-service [Retrieved on Sep. 18, 2013].

Blake Snow: "Disney Gets Into Kids' Social Network Game", gigaom, Jul. 18, 2007, XP055069817, Retrieved from the Internet: URL: http://gigaom.com/2007/07/18/disney-social-network/ [Retrieved on Sep. 18, 2013].

* cited by examiner

*Primary Examiner* — Calvin L Hewitt, II
*Assistant Examiner* — Zeshan Qayyum
(74) *Attorney, Agent, or Firm* — Farjami & Farjami LLP

(57) ABSTRACT

There is provided a system and method for providing access to a virtual object corresponding to a real object. There is provided a method comprising authenticating a user account for a networked application, confirming a validity of a user provided code, wherein the code is visible on the real object or on accompanying materials of the real object, and granting the user account access to the virtual object for use in the networked application in response to the confirming of the validity. As a result, users are enabled to enjoy interactions with real objects as well as corresponding virtual objects both in an offline video game context and in an online network application context.

12 Claims, 4 Drawing Sheets

REAL-WORLD ITEMS UNLOCKING VIRTUAL ITEMS ONLINE AND IN VIDEO GAMES

RELATED APPLICATIONS

This application claims priority to U.S. Provisional Application No. 61/280,178, filed Oct. 29, 2009, which is hereby incorporated by reference in its entirety.

BACKGROUND OF THE INVENTION

1. Field of the Invention

The present invention relates generally to online Internet applications. More particularly, the present invention relates to real world objects and online Internet applications.

2. Background Art

Online Internet applications such as social networking and community groups continue to be popular, allowing people to keep in touch with friends, family and associates, regardless of geographic boundaries. In particular, users enjoy creating their own online personas or avatars to express their creativity and sense of style. Some users may enjoy a sense of accomplishment from carefully customizing and nurturing their avatars with unique or rare accoutrements, whereas other users may enjoy socially interacting with others in a shared community with similar interests and tastes. With robust communication features, these online Internet applications may allow users to maintain or expand their social networks and to keep in contact.

On the other hand, since these applications are conducted entirely virtually in the online world, users may begin to miss some of the tangible and physical aspects of interactions in the real world. In particular, when customizing avatars on a flat computer screen, users may feel less excitement and enjoyment compared to playing and interacting with a real, tangible object like a doll or figure. However, users may be reluctant to forsake the benefits of online interactions by reverting back to traditional physical means of play, which can only be enjoyed by oneself or with the company of locally available friends, family and associates.

Accordingly, there is a need to overcome the drawbacks and deficiencies in the art by providing an interactive online application that is usable without sacrificing tangible interactivity.

SUMMARY OF THE INVENTION

There are provided systems and methods for providing access to a virtual object corresponding to a real object, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for providing access to a virtual object corresponding to a real object. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
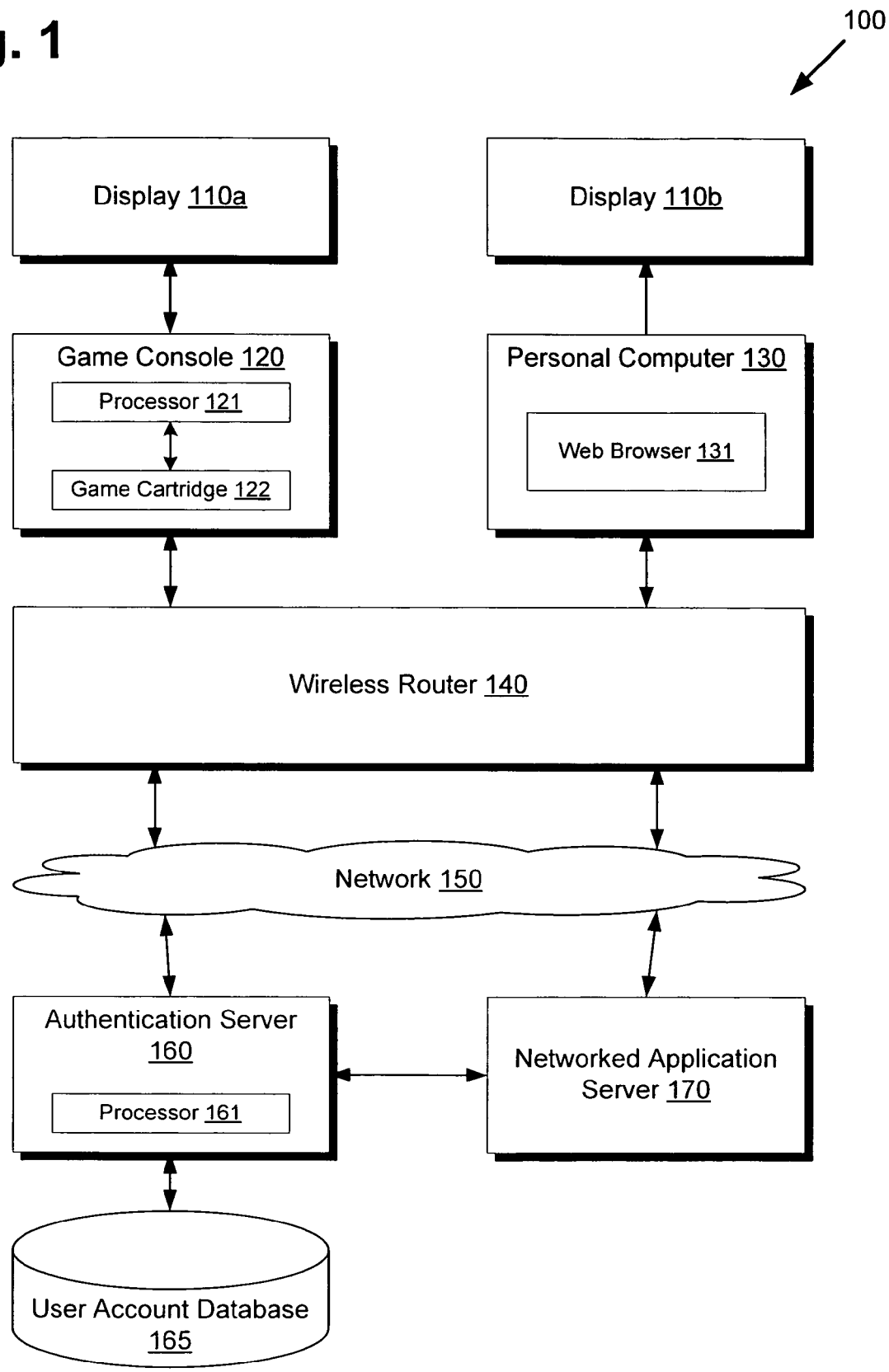
FIG. 1 presents a diagram of a system for providing access to a virtual object corresponding to a real object, according to one embodiment of the present invention.

FIG. 1 presents a diagram of a system for providing access to a virtual object corresponding to a real object, according to one embodiment of the present invention. Diagram 100 of FIG. 1 includes displays 110a-110b, game console 120, personal computer 130, wireless router 140, network 150, authentication server 160, user account database 165, and networked application server 170. Game console 120 includes processor 121 and game cartridge 122. Personal computer 130 includes web browser 131. Authentication server 160 includes processor 161.

Game console 120 may be designed for home use, in which case display 110a may comprise an externally connected display such as a television, or game console 120 may be designed for portable use, in which case display 110a may comprise a touch sensitive internal display. Game console 120 may use processor 121 to execute game cartridge 122, containing program and asset data for a video game application, and also storing user settings such as saved game progress. While game console 120 may be used independently of any network connections, game console 120 may also support network connectivity. For example, game console 120 may support WiFi communications, thus allowing a wireless connection to wireless router 140 providing access to network 150.

Similarly, personal computer 130 may comprise a desktop computer connected to an external display 110b, or may comprise a portable notebook computer having an internal display 120b. Personal computer 130 may also connect to wireless router 140 by WiFi, providing access to web servers connected to network 150, such as networked application server 170.

Wireless router 140 may comprise a Wi-Fi compatible router with a broadband uplink to network 150. The broadband uplink, not shown in FIG. 1, may be provided by a DSL modem, cable modem, fiber optic line, satellite link, or another connection method. Network 150 may comprise a publicly accessible network such as the Internet.

Authentication server 160 may provide user authentication services for networked application server 170 and game cartridge 122 executing on processor 121 of game console 120, providing secure access to user account database 165. User account database 165 may store data regarding user accounts for a persistently online social networking application supported by networked application server 170, which may provide a web based interface accessible by web browsers such as web browser 131 executing on personal computer 130.

After receiving an unlocking code printed directly on or accompanying a real object, a user of game console 120 may enter the code while game cartridge 122 is executing to unlock a corresponding virtual version of the real object. This virtual object may then be usable while game cartridge 122 is executing, or while the user is playing the game. However, if a connection to network 150 is available as shown in FIG. 1, and if the user provides login credentials such as a username or account number and password, then the same virtual object might also be unlocked for a networked application, such as a social networking application, executing on networked application server 170. For example, game cartridge 122 may be programmed to verify user provided credentials using authentication server 160, if a connection to network 150 is available. If authentication server 160 reports that the user is authorized, then authentication server 160 may be directed to modify the corresponding user account in user account database 165 to provide access to the newly unlocked virtual object.

Alternatively, the user may enter the unlocking code on a website. For example, the user may use personal computer 130 to direct web browser 131 to networked application server 170. Networked application server 170 may then provide an interface to the social networking application, which may include a section to enter unlocking codes. After the user provides user account authentication credentials and the unlocking code to networked application server 170, authentication server 160 may be used to access and modify a corresponding user account, similar to the process used by game console 120 above. In some cases, authentication might be expedited by depositing a session cookie with web browser 131, allowing the user to bypass re-entry of user account authentication credentials such as a username and password.

Whether the code is entered on game console 120 executing game cartridge 122 or through personal computer 130 executing web browser 131 accessing networked application server 170, a virtual version of a real object can be unlocked in user account database 165, allowing the use of the virtual object within a social networking application supported by networked application server 170. The virtual object may comprise, for example, an article of clothing or an accessory wearable or usable by an avatar of the user, a decoration or piece of furniture for placement in a virtual space or property, or any other object.

While FIG. 1 only shows a single game console 120, a single personal computer 130, a single authentication server 160, and a single networked application server 170, alternative embodiments may support multiple connected game consoles and personal computers for multiplayer and multi-user interactivity, and multiple servers may be deployed for load balancing and improved network responsiveness.

Figure 2A:
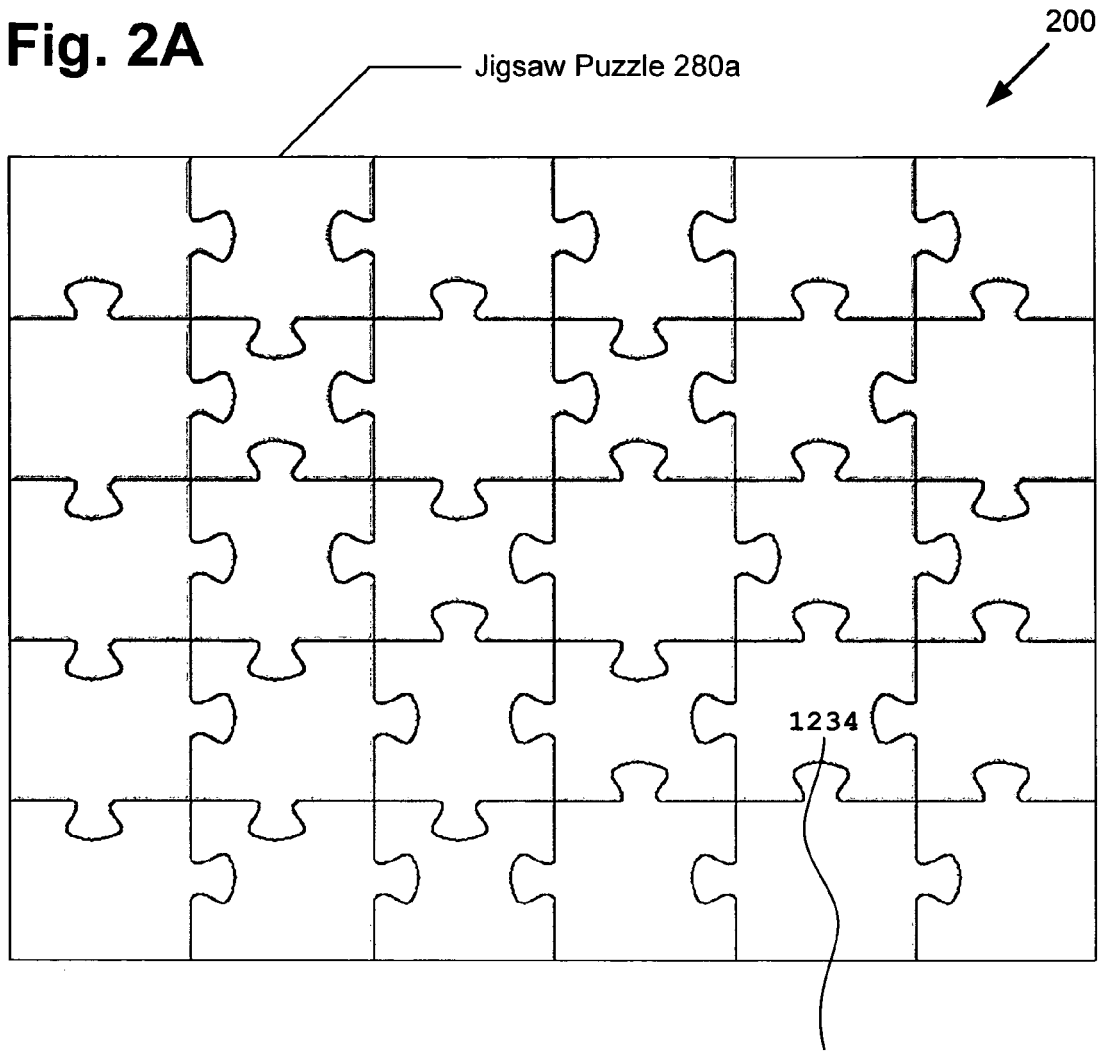
FIGS. 2A and 2B show exemplary real objects, according to embodiments of the present invention.
Figure 2B:
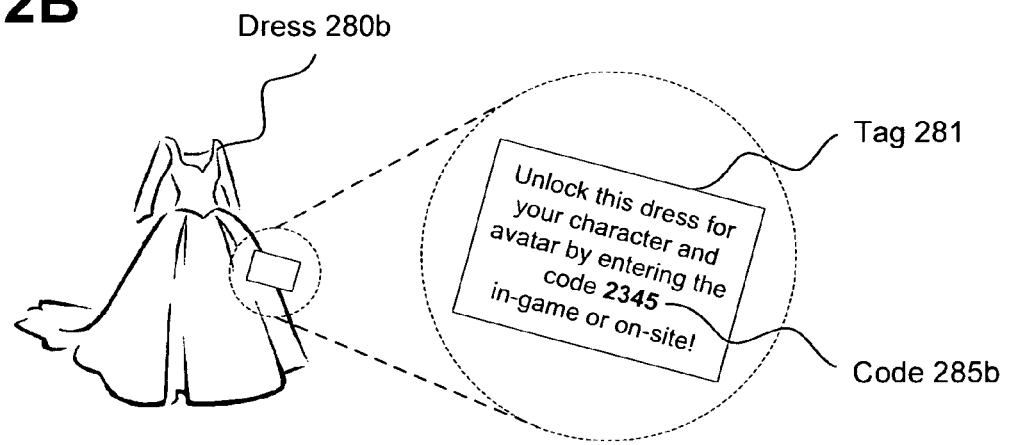

FIGS. 2A and 2B show exemplary real objects, according to embodiments of the present invention. Diagram 200 of FIG. 2A shows jigsaw puzzle 280a having a code 285a printed directly upon it. Diagram 200 of FIG. 2B shows dress 280b including an attached tag 281 with a printed code 285b.

Although shown as blank when fully assembled in FIG. 2A, jigsaw puzzle 280a may, for example, show a cross-promotional image related to the contents of game cartridge 122. For example, both game cartridge 122 and jigsaw puzzle 280a may depict characters, scenes, and settings from a shared film, animation, book, or other creative work. After jigsaw puzzle 280a is fully assembled by a user, a code 285a may be clearly visible to the user. Although code 285a is shown printed directly on a single jigsaw piece in FIG. 2A, alternative embodiments might spread code 285a across adjacent jigsaw pieces to encourage full completion of the jigsaw puzzle. Promotional materials for jigsaw puzzle 280a, such as retail packaging or advertising copy, may emphasize that code 285a is included with the jigsaw puzzle to unlock a virtual jigsaw puzzle in a corresponding video game, such as game cartridge 122 of FIG. 1, or to unlock a virtual jigsaw puzzle for a social networking application supported by networked application server 170 of FIG. 1. The virtual jigsaw puzzle may depict the same image as jigsaw puzzle 280a, and may allow the user to play a virtual jigsaw puzzle game on game console 120 or personal computer 130 of FIG. 1. The virtual jigsaw puzzle might also be shared or traded with other users.

While code 285a and code 285b are shown as a four digit numerical codes, alternative embodiments might use alphanumeric digits, artistic symbols, or other representations. For example, code 285a might be shown as a one-dimensional or two-dimensional barcode, which may then be read by a camera of a mobile phone or another optical scanning device.

Dress 280b may, for example, comprise a dress sized for children or adults, or a smaller version suitable for dolls or figures. As shown in FIG. 2B, tag 281 may be attached to dress 280b, explaining that code 285b may be used to unlock a virtual version of the dress "in-game" while playing game cartridge 122 of FIG. 1 or "on-site" while using the web based social networking application supported by networked application server 170 of FIG. 1. Although code 285 is shown on tag 281 in FIG. 2B, code 285 might also be visible on other accompanying materials such as retail packaging for dress 280b. The virtual version of dress 280b may comprise a visual replica of dress 280b, having the same appearance, design, colors, and other visual features. Thus, when viewed on display 110a or 110b of FIG. 1, the virtual version of the dress may visually look like dress 280b, subject to technological limitations such as low resolution or limited graphics hardware on game console 120 or personal computer 130.

Figure 3:
FIG. 3 presents the exemplary output of displays in a system for providing access to a virtual object corresponding to a real object, according to one embodiment of the present invention.
Figure 3:

FIG. 3 presents the exemplary output of displays in a system for providing access to a virtual object corresponding to a real object, according to one embodiment of the present invention. Diagram 300 of FIG. 3 includes displays 310a-310b. With regards to FIG. 3, it should be noted that display 310a corresponds to display 110a from FIG. 1, and that display 310b corresponds to display 110b from FIG. 1.

As shown in display 310a, which corresponds to a screen of game console 120 in FIG. 1, the user may be prompted to enter a code to unlock in-game items. After confirming that the entered code is valid, the virtual object, "Elegant Dress," is accessible to the user, having the effect of increasing the user's "Charm" value by 10 points while playing game cartridge 122 of FIG. 1. As previously discussed, if game console 120 has access to an Internet connection, the same "Elegant Dress" might also be unlocked for a networked application such as a web based social networking application. For example, game cartridge 122 may allow the user to enter in user credentials, such as a username and password, for authenticating and linking with the social networking application.

Thus, assuming the example above where an Internet connection is available to game console 120, if the user decides to log in to her social networking account on personal computer 130 of FIG. 1, she may see a screen similar to display 310b of FIG. 3. Besides new information concerning her social network, she may also be notified that the "Elegant Dress" that was previously unlocked in the video game is also accessible for her avatar, as shown to the right in display 310b. For example, game console 120 may have previously used authentication server 160 to store data in user account database 165 indicating the unlocking of the "Elegant Dress" for the user account. When networked application server 170 uses authentication server 160 to retrieve details concerning the user account, the virtual object "Elegant Dress" may also be retrieved. In this manner, the unlocked item is usable both within the video game in a non-networked environment and also in the social networking application within a networked environment.

Figure 4:
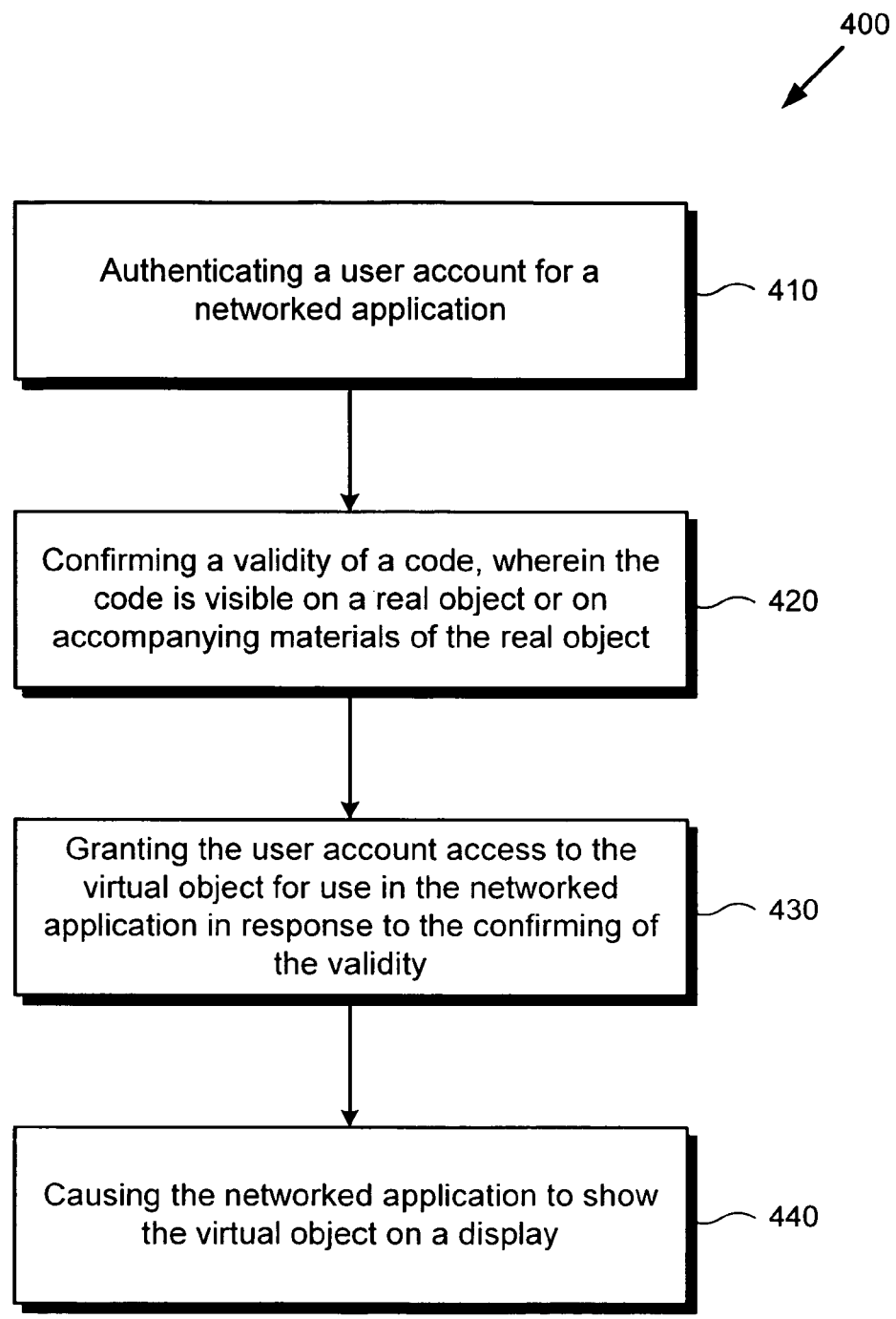
FIG. 4 shows a flowchart describing the steps, according to one embodiment of the present invention, by which access to a virtual object corresponding to a real object may be provided.

FIG. 4 shows a flowchart describing the steps, according to one embodiment of the present invention, by which access to a virtual object corresponding to a real object may be provided. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and diagram 100 of FIG. 1, step 410 of flowchart 400 comprises processor 161 of authentication server 160 authenticating a user account stored in user account database 165 for a social networking application supported by networked application server 170. For example, game console 120 or personal computer 130 may have established a connection to authentication server 160 over network 150 via a Wi-Fi connection to wireless router 140, so that a user provided username and password can be checked for validity. As previously discussed, alternative user account credentials such as web browser cookies may be accepted in lieu of a user provided username and password. Processor 161 may then confirm that the provided credentials are valid by querying user account database 165.

Referring to step 420 of flowchart 400 in FIG. 4, diagram 100 of FIG. 1, and diagram 200 of FIG. 2B, step 420 of flowchart 400 comprises processor 161 of authentication server 160 confirming a validity of code 285b, wherein code 285b is visible on tag 281 accompanying dress 280b. Alternatively, referring to FIG. 2A, step 420 may confirm the validity of code 285a, wherein code 285a is visible as directly printed on jigsaw puzzle 280a. For the present example, code 285b shall be assumed. As with step 410, step 420 may be in response to user input received from either game console 120 or personal computer 130, but for the present example, user input from game console 120 shall be assumed. Thus, a user may enter in the digits "2345" representing code 285b using, for example, touch sensitive display 110a. This scenario is also depicted on display 310a of FIG. 3. Game cartridge 122 may then contain a list of valid codes, which processor 121 can use to check against the user entry. If the verification is positive, then authentication server 160 may be notified. Alternatively, game console 120 may forward code 285a to authentication server 160, which may then verify code 285a against its own internal list of valid codes. In either case, authentication server 160 is then able to confirm the validity of the user provided code 285b for unlocking a virtual version of dress 280b.

Referring to step 430 of flowchart 400 in FIG. 4, diagram 100 of FIG. 1, and diagram 200 of FIG. 2B, step 430 of flowchart 400 comprises processor 161 of authentication server 160, in response to step 420, granting the user account authenticated in step 410 access to the virtual version of dress 280b for use in the social networking application supported by networked application server 170. For example, a data object may be placed in the user account of user account database 165, wherein the data object indicates access to a virtual "Elegant Dress" corresponding to dress 280b.

Referring to step 440 of flowchart 400 in FIG. 4, diagram 100 of FIG. 1, and diagram 200 of FIG. 2B, step 440 of flowchart 400 comprises processor 161 of authentication server 160 to cause the social networking application supported by networked application server 170 to show the virtual "Elegant Dress" corresponding to dress 280b on display 110b. For example, the user may decide to log in to the social networking application on personal computer 130, as previously described. Networked application server 170 may then query authentication server 160 for details regarding the user account, including any virtual items. Processor 161 may then discover that the user account has access to the virtual "Elegant Dress" in user account database 165, thus notifying networked application server 170 to cause the "Elegant Dress" to show on display 110b as part of the user's inventory or worn by an avatar of the user, as shown in display 310b of FIG. 3. As a result, the user is enabled to enjoy virtual use of the virtual "Elegant Dress" corresponding to the real dress 280b, both within the offline game cartridge 122 and the online social networking application. Of course, this is also applicable to any other item, such as jigsaw puzzle 280a of FIG. 2A, opening up new cross-promotional opportunities and providing greater value and enjoyment for users, both in real and virtual worlds.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method, for use by a hardware processor, for providing access to a virtual object corresponding to a real object having a code stored thereon, wherein a user enters the code into a game console, the method comprising:
receiving, by the hardware processor, the code from the game console;
confirming, by the hardware processor, a validity of the code;
granting to the game console, by the hardware processor, access to the virtual object, in response to confirming the validity of the code;
receiving, by the hardware processor, from the game console, account information associated with an account of the user;
authenticating, by the hardware processor, the account information received from the game console;
associating, by the hardware processor, the virtual object with the account of the user, in response to authenticating the account information received from the game console;

receiving, by the hardware processor, the account information associated with the account of the user from a networked application server in communication with a computer over a network, wherein the computer is separate from the game console;

authenticating, by the hardware processor, the account information received from the networked application server; and granting to the computer, by the hardware processor, access to the virtual object associated with the account of the user, in response to authenticating the account information received from the networked application server.

2. The method of claim 1, further comprising:
causing the networked application to show the virtual object on a display.

3. The method of claim 1, wherein the code is obtained by the user from the real object in response to the user playing a game using the real object.

4. The method of claim 1, wherein the virtual object corresponds to the real object by comprising, in the networked application, a visual replica of the real object.

5. The method of claim 1, wherein the code is visible on the real object by being printed on the real object.

6. The method of claim 1, wherein the code becomes visible on the real object in response to the user playing the game using the real object.

7. The method of claim 1, wherein the real object is a puzzle, and wherein the code becomes visible by solving the puzzle.

8. The method of claim 1, wherein the code comprises a string of numeric digits.

9. The method of claim 1, wherein the code comprises a string of alphanumeric digits.

10. The method of claim 1, wherein the code comprises a bar code.

11. The method of claim 1, wherein the real object comprises a piece of clothing, and wherein the virtual object comprises a visual replica wearable by an avatar of the user account in the networked application.

12. The method of claim 1, wherein the networked application comprises a persistently online social networking application.

* * * * *